Aug. 28, 1951  F. B. DEMPSEY  2,566,019
THERMOSTATIC PRESSURE REGULATOR
Filed April 21, 1945  6 Sheets-Sheet 1

INVENTOR
FRANK B. DEMPSEY
BY George H. Fisher
ATTORNEY

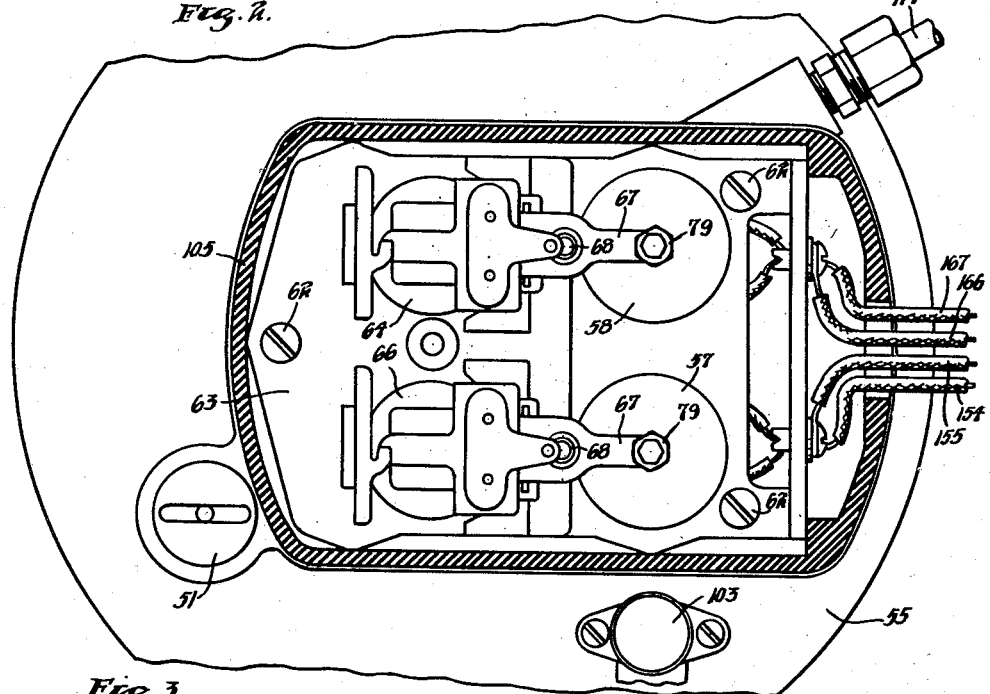
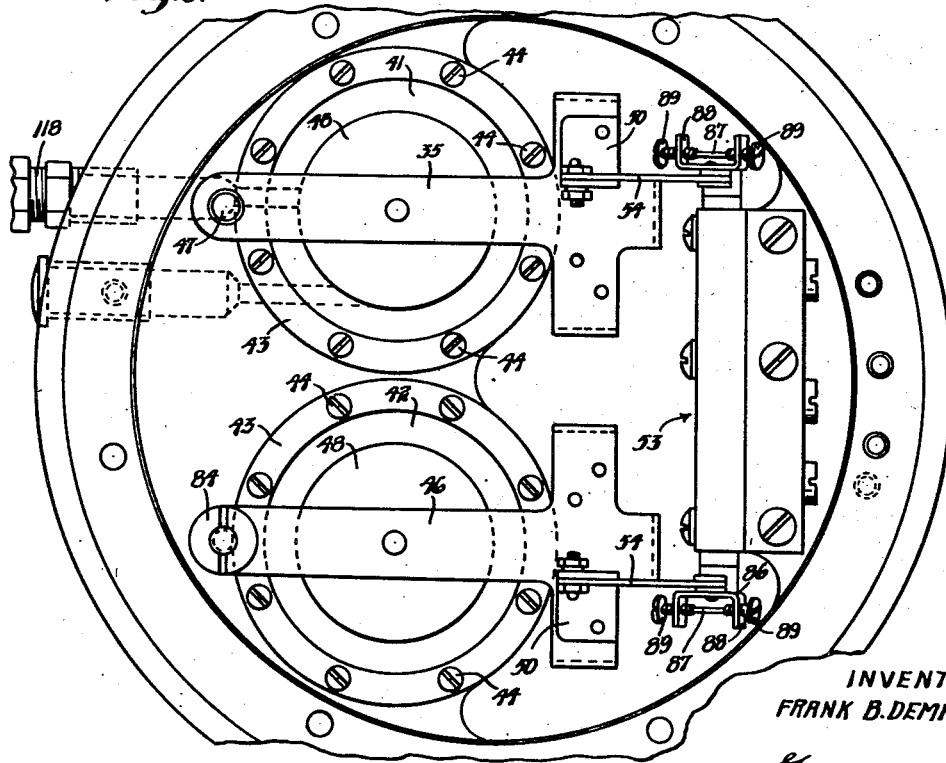

Aug. 28, 1951 F. B. DEMPSEY 2,566,019
THERMOSTATIC PRESSURE REGULATOR
Filed April 21, 1945 6 Sheets-Sheet 3
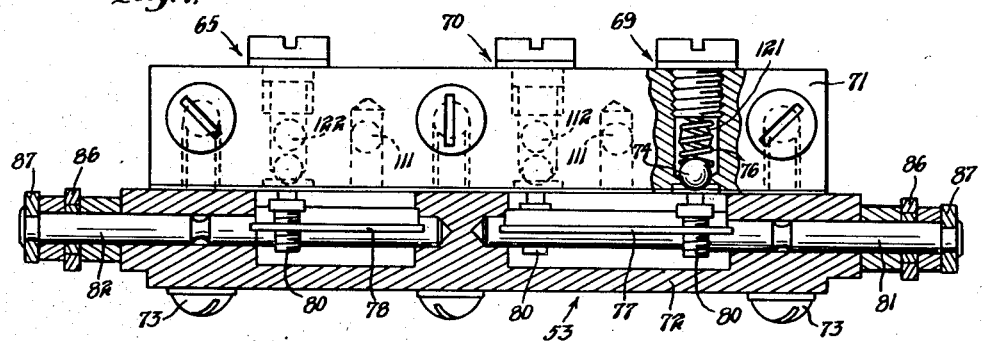
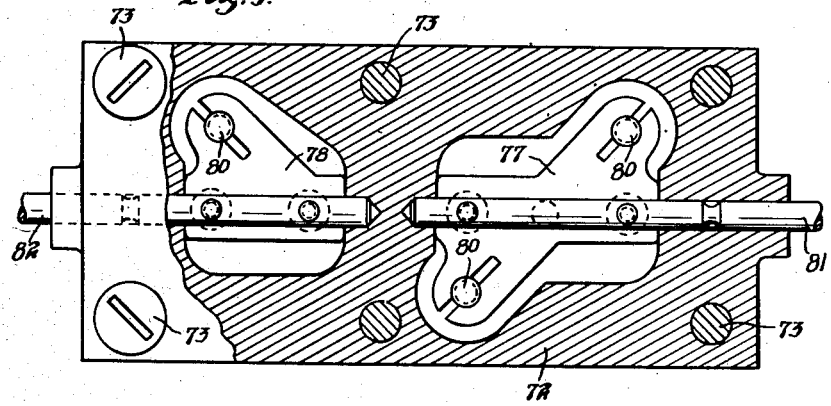
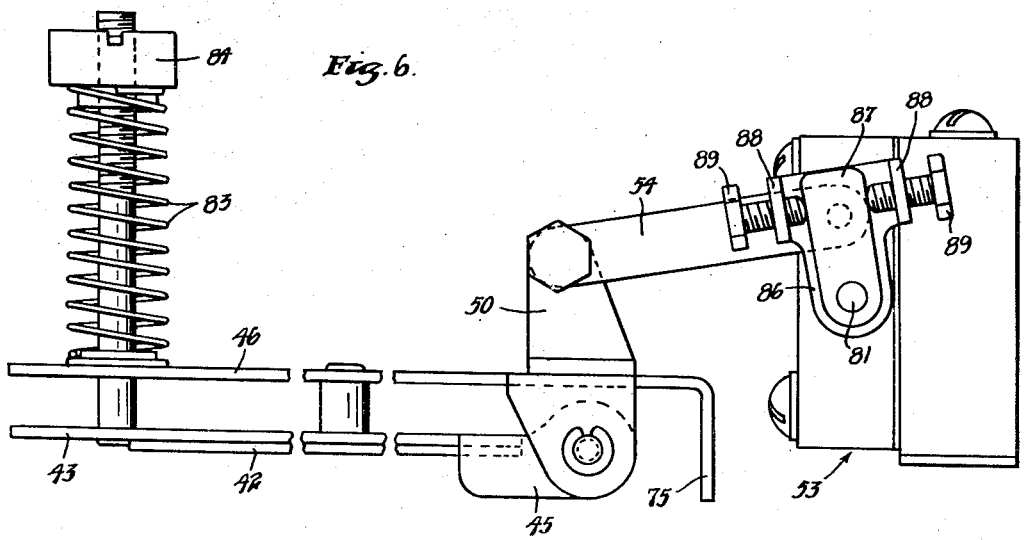
INVENTOR
FRANK B. DEMPSEY
BY George H. Fisher
ATTORNEY INVENTOR
FRANK B. DEMPSEY
BY George H. Fisher
ATTORNEY Aug. 28, 1951                F. B. DEMPSEY                2,566,019
                     THERMOSTATIC PRESSURE REGULATOR
Filed April 21, 1945                              6 Sheets-Sheet 5

INVENTOR
FRANK B. DEMPSEY
BY George H. Fisher
ATTORNEY

Aug. 28, 1951         F. B. DEMPSEY         2,566,019
THERMOSTATIC PRESSURE REGULATOR
Filed April 21, 1945                        5 Sheets-Sheet 6
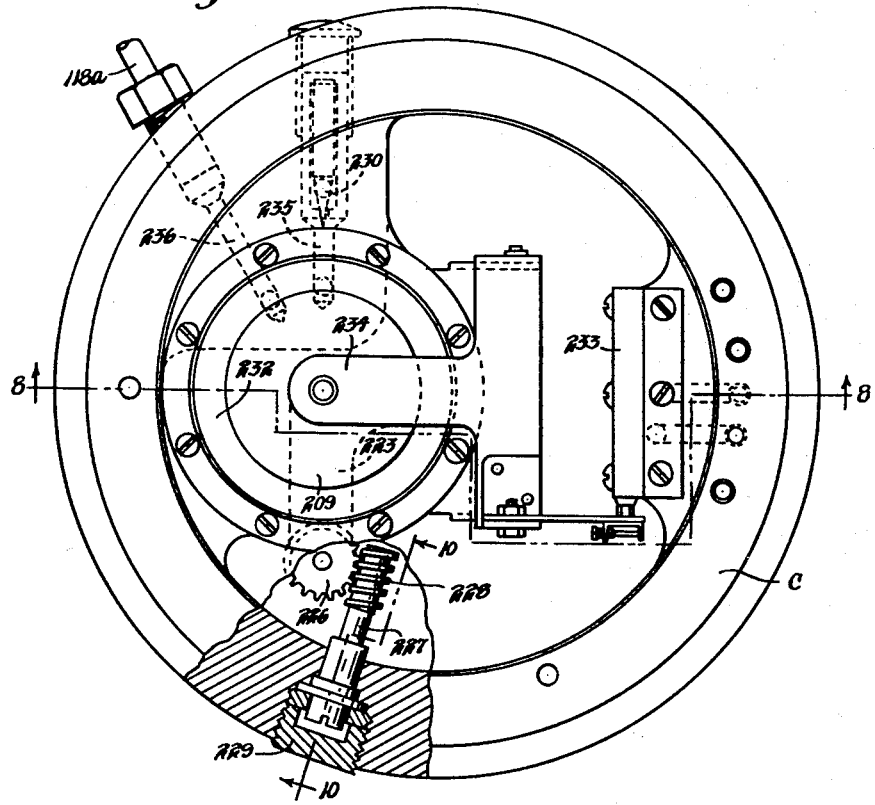
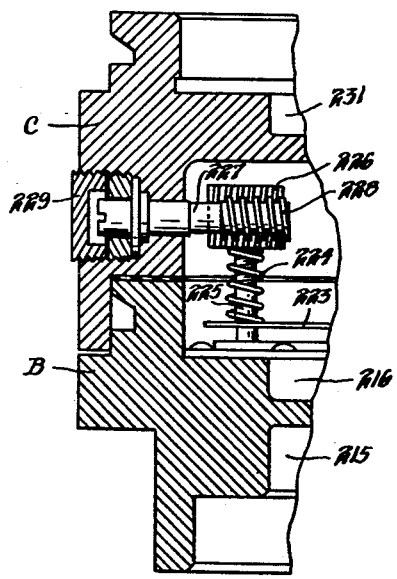
INVENTOR
FRANK B. DEMPSEY
BY George H. Fisher
ATTORNEY Patented Aug. 28, 1951

2,566,019

UNITED STATES PATENT OFFICE 2,566,019

THERMOSTATIC PRESSURE REGULATOR

Frank B. Dempsey, Minneapolis, Minn., assignor to Minneapolis-Honeywell Regulator Company, Minneapolis, Minn., a corporation of Delaware Application April 21, 1945, Serial No. 589,521

12 Claims. (Cl. 236—84)

This invention relates to an improved single seat control valve which is especially adaptable for use in conjunction with fluid fired burners for furnaces, boilers or the like. However, employment of the device may be extended to other fields and uses.

One of the principal objects of importance and advantage of the improved device of this invention resides in the provision of means for disposing a pressure regulator control and a flow modulating control in association with a single valve to govern flow therethrough responsive to unrelated conditions. The controls are arranged to operate concurrently yet independently of each other in response to fuel supply pressure variations for one control and temperature or other condition changes for the other.

Another object of advantage and importance is the provision of means for constructing the casing of the improved device of a plurality of housing members adapted to be telescoped together in fluid tight association. Additionally, adjustment members of the improved structure are easily accessible and the device is compact. Radially extending flanges are omitted and the housing members are provided with telescoping connecting portions. Consequently, space required for installing, operating, storing or shipping is reduced to a minimum.

A further object of importance and advantage resides in the provision of means for mounting a complete control unit in each of the housing members so that the assembly of the housing members may be varied to produce differently functioning valves. This change in assembly, in which one or more of the housing members may be omitted, may be made without altering or changing the remaining members in any way or impairing their functions.

A further object of importance resides in the provision of means whereby the control elements, such as pressure regulator and flow modulator controls, may both be positioned in a single casing member or each may be positioned in a separate casing member. In the various assemblies, on and off regulation is preferably controlled by a relay actuated valve mechanism located on the cover portion of the housing and flow modulating and pressure regulating control is obtained through pressure actuated valve mechanisms positioned in the intermediate member, or members, of the casing.

Still another object of advantage and importance of the improved device of this invention is the provision of means for employing a plurality of pilot valves to control the operating mechanism. The pilot valve means are disposed in parallel to control flow of operating pressure to the valve positioning motor and are disposed in series to control flow from said motor.

An additional object of advantage and importance is the provision of means for economically producing a highly sensitive and accurate control valve in a plurality of independent units each of which is complete in itself. The units may be packed and marketed in groups or individually and may be assembled in the field without special tools or equipment. Additionally, where it is so desired or necessary, additional units may be added to or be taken from the original assembly to meet altered conditions or requirements.

Additional objects of advantage and importance will become apparent as the following detailed description progresses, reference being had to the accompanying drawings wherein:

Figure 2 is a top plan view of the upper portion of the valve, portions thereof being broken away;

Figure 3 is a horizontal section taken on the line 3—3 of Figure 1. Portions of the structure are broken away;

Figure 4 is a slightly enlarged top plan view of the regulator and modulator pilot valve, portions thereof being broken away;

Figure 5 is an elevational view of the operator portion of the pilot valve shown in Figure 4. Portions of the structure are broken away to more clearly show its internal construction;

Figure 6 is a slightly enlarged end elevation of the pilot valve and operating arm mechanism therefor;

Figure 7:
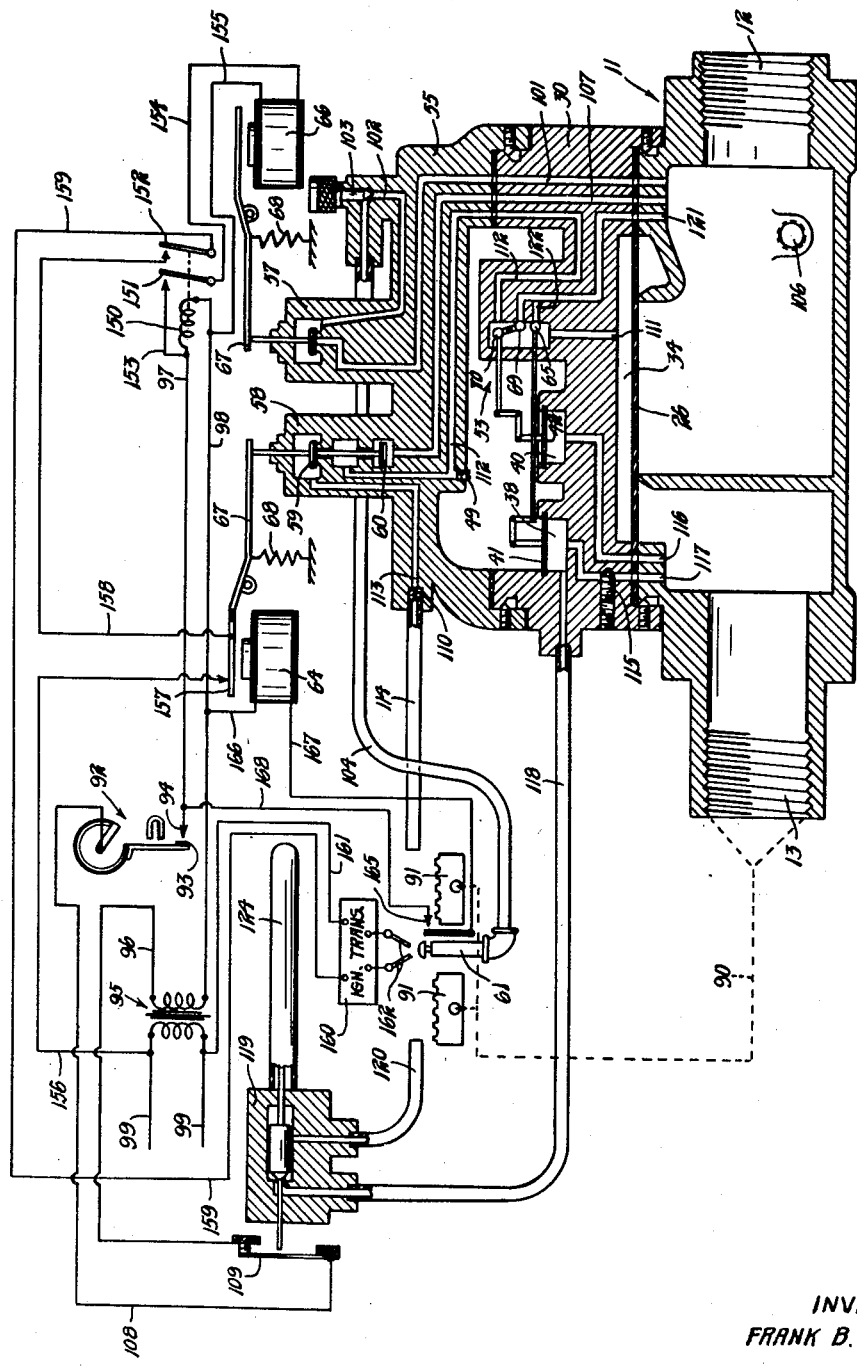
Figure 8:
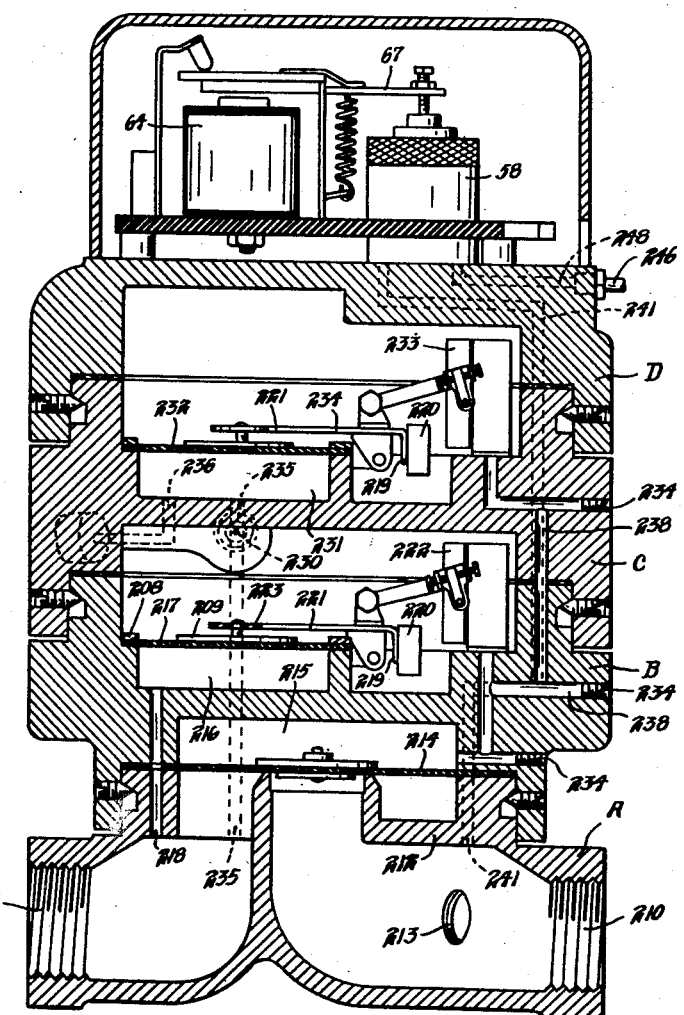

Figure 7 diagrammatically illustrates a complete installation of the improved control device of this invention;

Figure 8 is a vertical section of a modified form of the invention taken substantially on line 8—8 of Fig. 9.

Figure 11:
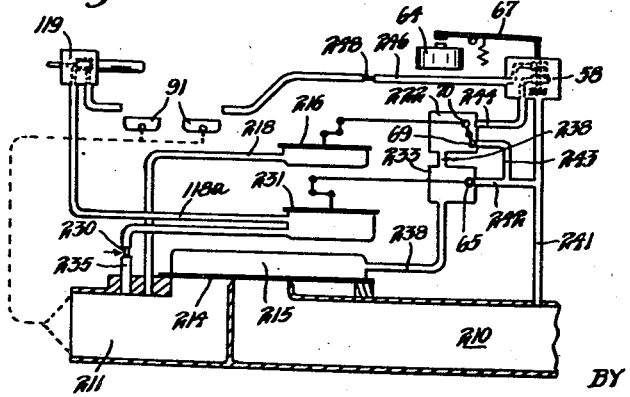

Figure 9 is a top plan view of the upper intermediate casing member of the structure shown in Fig. 8, portions thereof being broken away;

Figure 10 is a vertical section of a fragmental portion of the structure taken on line 10—10 of Figure 9 looking in the direction indicated by the arrows;

Figure 11 diagrammatically illustrates the gas circuit for operating the embodiment shown in Figures 8, 9, and 10.

Figure 1:
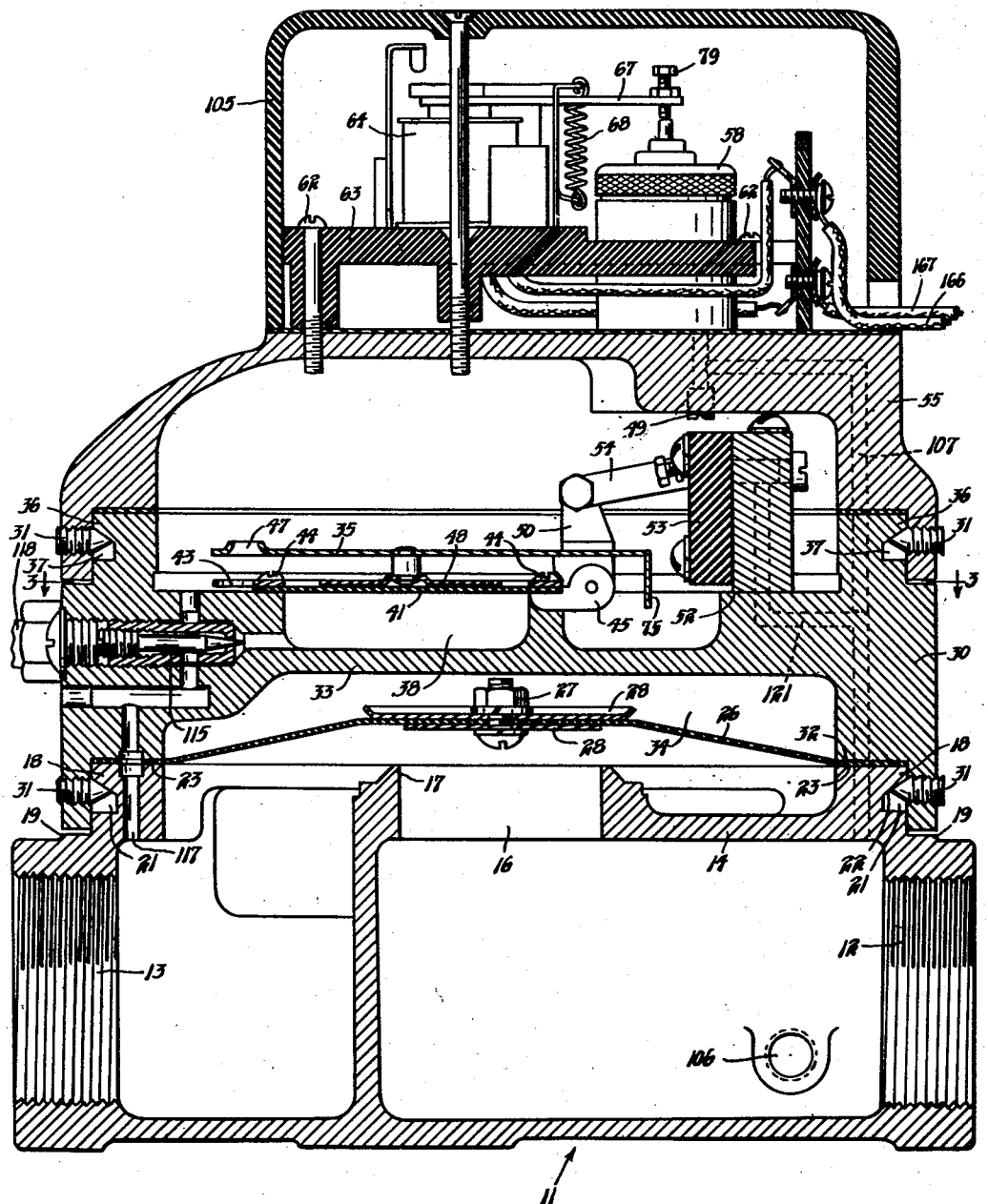
Figure 1 is a vertical section of a control valve which embodies the invention.

Referring to Figure 1, the reference numeral 11 indicates generally a casing member in which is formed an inlet opening 12 and an outlet opening 13. Formed in the casing member 11 intermediate the inlet and outlet openings is a wall 14 having an aperture 16 therein. The upper edge of the aperture 16 is formed to provide a valve seat 17, as is clearly shown in the drawing.

The casing member 11 is preferably circular in plan formation and the upper portion thereof is restricted as indicated by the reference numeral 18. A shoulder 19 is formed at the base of the restricted portion and the peripheral surface of that portion immediately above the shoulder is provided with an annular groove 21. As shown in the drawing, the upper surface 22 of the annular groove 21 is formed at an angle to the horizontal for a purpose to be more fully set forth and explained hereinafter. The upper surface 23 of the restricted portion 18 is machined or otherwise faced to receive the circumferential portion of a diaphragm 26 as is best shown in Figure 1. Secured to opposed sides of the central portion of the diaphragm 26, as by a bolt and nut assembly 27, are reenforcing plates 28. The reenforced central portion of the diaphragm 26 is adapted to cooperate with the seat 17 to provide a main valve, the function of which is to control flow between the inlet 12 and the outlet portion 13 of the casing 11.

Telescopingly positioned on the restricted portion 18 of the casing member 11 is an intermediate casing member 30. A plurality of screws 31 having tapered ends engageable with the inclined upper surface 22 of the annular groove 21 provides means for securing the member in position and also urges an internal shoulder 32 thereof against the diaphragm 26 and surface 23 to produce a fluid tight joint between the joined members. A wall 33 spanning the central portion of the intermediate casing member 30 in conjunction with the diaphragm 26 forms a pressure chamber 34. A restricted portion 36 formed on the upper portion of the intermediate casing member 30 is the same as the corresponding portion of the lower casing member 11. The peripheral surface of the restricted portion 36 also carries an annular groove 37 similar to and for the same purpose as the groove 21. Formed in the upper surface of wall 33, as is best shown in Figures 1, 3, and 7, is a pair of recesses 38 and 40, each of which is covered by a diaphragm 41 and 42, respectively. The diaphragms 41 and 42 are conveniently maintained in sealed engagement with the edges of the recesses with which they are associated by identical rings 43 which in turn are secured in place by a plurality of screws 44. The recess 38 in conjunction with the diaphragm 41 forms a pressure actuated motor for operating a modulating control and the recess 40 in conjunction with the diaphragm 42 forms a second pressure actuated motor and it functions to operate a regulator control.

Pivotally secured to ears 45 on the front portion of each of the rings 43 and having portions thereof overlying the diaphragms 41 and 42 are identical operating arms indicated by the reference numerals 35 and 46. Operating arm 35 functions to operate the portion of a pilot valve 53 associated with the modulator or limit control and operating arm 46 functions to operate the portion of the pilot valve 53 associated with the pressure regulator control as will hereinafter more fully appear. The operating arms are substantially T-shaped in plan and are apertured at 47 closely adjacent the end of the longitudinal portions thereof, as is best shown in Figures 1 and 3. Secured to the central portion of each operating arm and spaced from the lower surface thereof, is a circular plate 48 substantially concentric with the diaphragm with which it is associated. These plates 48 normally engage the diaphragms and serve to transmit operating movement therefrom to the operating arm to which it is connected. Secured to the transverse portion of each T-shaped operating arm are identical bracket members 50. The pressure actuated pilot valve 53 is positioned on a raised portion 52 of the wall 33. The pilot valve 53 is operably connected to the bracket members 50 by connecting links 54 as will hereinafter more fully appear.

Telescopingly positioned on the intermediate casing member 30 and secured thereto by screws 31 projecting into groove 37 is an upper casing member 55. The upper casing member 55 provides a cover for the intermediate casing member 30 and its lower portion is formed precisely the same as is the lower portion of the intermediate casing member. The attaching portion of the upper casing member 55 being formed the same as the securing portion of the intermediate casing member 30, it will be apparent that the member 55 may be positioned on and be secured to the lower casing member 11. When so assembled the structure provides an "on" and "off" valve. This alteration to produce an "on" and "off" valve or a pressure regulating flow modulating control valve may be made in the field without special tools or equipment.

Removably secured in an adjustment opening in the top portion of casing member 55 is an apertured plug 51 (see Figure 2). The plug 51 which functions to vent the chamber formed by the joined casing members 55 and 30, may be removed for adjustment purposes hereinafter more fully disclosed.

Positioned on the upper surface of the casing member 55 and secured thereto by any suitable means is a pair of relay operated pilot valves indicated by the reference numerals 57 and 58. Pilot 57 which has a single valve is adapted to control the flow of fuel to a pilot burner 61 (see Figure 7) and pilot 58 which has two movable valve members 59 and 60 functions to control operating pressure to and from the pressure actuated pilot valve 53 as will hereinafter be more fully disclosed. A plurality of passages in the several housing members are disposed to align upon assembly to form passageways indicated by the reference numerals 101, 107, 112, and 121, and schematically shown in their entirely in Figure 7. Of these passages, 101 functions as a supply line for pilot valve 57 which controls the flow of fuel to pilot burner 61, and passages 107 and 121 function as supply lines for pilot valves 58 and 53. Passage 112 is disposed to connect pilot valves 53 and 58 and flow therethrough may be in either direction. A continuation of passage 112 extends into the recessed portion of casing 55, but is normally closed by a plug 49.

Passage 113 is arranged to provide an outlet for pilot valve 58 and may have associated therewith an extension 114 as is best shown in Figure 7. Positioned in the passage 113 closely adjacent extension 114 is a spud or restrictor 110. The restrictor 110 is preferably not adjustable, but is replaceable so that a restrictor of suitable size may be inserted to meet specific requirements.

Additional passages 116 and 117 are formed in casing members 11 and 30. The passages 116 and 117 extend from the outlet portion 13 of the casing member 11 into the recesses 40 and 38, respectively, in casing member 30 as is best shown in Figure 7. A needle valve 115 is positioned in passage 117 to provide means for selectively adjusting flow therethrough.

Positioned on the upper surface of the casing member 55 and secured thereto by screws 62 is a platform 63 upon which relays 64 and 66 are positioned. Relay 64 is positioned to operate pilot valve 58 and relay 66 is positioned to operate pilot valve 57 through identical operating arms 67. Biasing springs 68 urge both operating arms 67 towards deenergized position. As is clearly shown in Figs. 1 and 2, each operating arm 67 carries an adjustment screw 79 by means of which the position of each operating arm may be altered in respect to the stem of the relay actuated pilot valve with which it is associated. A cover member 105 encloses the operating mechanism positioned on the upper surface of casing member 55.

As is best shown in Figures 4, 5, and 6, the pressure actuated pilot valve generally indicated by the reference numeral 53 comprises a valve housing 71 and an operator housing 72 secured to each other by suitable means, as for instance by screws 73.

The valve housing member 71 has positioned therein a plurality of passageways in certain of which are operably positioned three valves indicated by the reference numerals 65, 69, and 70. Each valve comprises a ball 74 and a biasing spring 76, and is operable to control flow through a passage in the assembled casing members with which it is associated. Valve 65 functions to control flow of operating pressure through passageway 122 to the pressure chamber 34; valve 69 controls flow of pressure through passageway 121 to chamber 34, and valve 70 functions to control flow of pressure through passageway 112 both to and from the pressure chamber 34, under conditions later explained.

The operator housing 72 is recessed to receive operating members 77 and 78 as is best shown in Figures 4 and 5. When housing 72 is associated with housing 71, the recess in which operating member 77 is positioned functions to connect passages 111, 112, and 121 to form the pressure regulator control side of pilot valve 53. The recess in which operating member 78 is positioned connects passages 111 and 122 on the modulator or flow control side of pilot valve 53. Operating members 77 and 78 are mounted on shafts 81 and 82, respectively. Rotation of shaft 81 operates member 77 to open and close valves 69 and 70 on the pressure regulator control side of pilot valve 53, and rotation of shaft 82 operates member 78 to open or close valve 65 on the modulator side of pilot valve 53. Each of the controls operates independently of the other. Adjustment means in the form of identical screws 80 are provided between the operating members and valves as is best shown in Figures 4 and 5. The screws 80 associated with valves 69 and 70 are adjusted so that both valves 69 and 70 may be in open position at the same time as hereinafter more fully explained.

As is best shown in Figures 3 and 6, the operating arm 46 associated with diaphragm 42 is provided with a biasing spring 83 and an adjustment nut 84. In assembly the adjustment nut 84 aligns with the aperture in casing member 55 in which plug 51 is positioned. Accordingly the adjustment nut 84 is accessible for adjustment purposes upon the removal of plug 51. It is to be noted that operating arm 35 although similar in construction to operating arm 46 is not provided with similar adjustment means. However, the right end of each arm 35 and 46 is turned downwardly as is best shown in Figs. 1 and 6, to provide a space 75 for attaching a counterweight.

Each operating link 54 is secured to a yoke 86 and the yoke in turn is rotatably positioned on either shaft 81 or shaft 82. Rigidly secured to each shaft 81 and 82 and rotatable therewith is a crank member 87 which has a portion extending intermediate the outwardly turned lug portions 88 of yoke 86. Screws 89 operably positioned in the outwardly turned lug portions 88 of each yoke, as is best shown in Figure 6, provides means for adjusting the crank 87 relative to the yoke 86.

In Figure 7, the improved device of this invention is schematically shown positioned in a fuel supply line 90 leading to a burner 91 and electrically connected to a snap action thermostat 92. The thermostat 92 is of well known design and has a contact 93 positioned on the lower portion of the movable arm thereof which is adapted to be moved into and out of engagement with a stationary contact 94. The thermostat 92 is shown connected in a circuit which includes a transformer 95. The primary winding of transformer 95 is connected to a source of supply through line voltage conductors 99. This thermostat circuit is arranged to operate a relay indicated by the reference numeral 150, and the circuit may be traced as follows: from the secondary winding of the transformer 95 through conductor 96, switch 109, conductor 108, thermostat 92, contact 93, stationary contact 94, conductor 97, relay 150, conductor 98, to secondary winding of transformer 95.

Mechanically connected to the relay 150 and adapted to be concurrently operated thereby is a pair of switches 151 and 152, both of which are biased to open position. Switch 151 is arranged to control the opening and closing of a circuit for energizing relay 66. This circuit may be traced as follows: from the transformer 95 through conductor 96, switch 109, conductor 108, thermostat 92, contacts 93 and 94, conductor 97, conductor 153, switch 151, conductor 154, relay 66, conductor 155, conductor 98, to the transformer 95. Switch 152 functions to control a line voltage circuit from a conductor 99 through conductor 156, cut-out switch 157, conductor 158, relay actuated switch 152, conductor 159, ignition transformer 160, conductor 161, to line voltage conductor 99. The energization of the ignition transformer 160 produces a fuel igniting spark in the gap between electrodes 162. It is to be noted that switches 157 and 152 are in series and that switch 152 is biased to open position and switch 157 is biased to closed position.

In the assembly shown in Figure 7 relay 64 is connected in a circuit operated by a flame responsive device such as switch 165. For the purposes of illustration, the switch 165 is shown as comprising a bimetal member biased to open position and which upon the establishment of a pilot flame warps to close the circuit which may be traced as follows: from the secondary winding of transformer 95 through conductor 96, switch 109, conductor 108, thermostat 92, contacts 93 and 94, conductor 168, switch 165, conductor 167, relay 64, conductor 166, conductor 98, to transformer 95.

As previously stated the parts of the improved device of this invention may be assembled in various ways to produce valves having different operating characteristics. For instance, the intermediate section 30 may be omitted and the top casing member 55 may be assembled with the lower casing member 11. Such an assembly would produce an on and off valve. In such an assembly the plug 49 is removed to provide a passage from the chamber above the diaphragm 26 to the pilot valve 58. Another variation in the assembly could be made if it were found desirable or expedient to operate the device in conjunction with a constantly burning pilot light. In such an assembly the pilot valve 57, relay 66 and circuit therefor, as well as the ignition circuit could be omitted. The pilot burner may then be supplied through a pipe extending to the burner from a casing member 11 where it may be secured in the orifice 106 thereof. These changes may be made without altering or changing the remaining parts of the assembly.

Operation

Referring now to the operation of the improved device of this invention, let it be assumed that in the arrangement shown in Figure 7, the space in which the thermostat 92 is positioned is warm. Consequently, the contact 93 is separated from contact 94 and the entire device is in its inactive position. The pilot valve 57 is closed and the outlet of pilot valve 58 is also closed. However, valve 60 in pilot valve 58 is in open position. Consequently, fuel from the inlet 12 is permitted to flow through passage 107, pilot valve 58, passage 112, pilot valve 53, and passage 111, into the chamber 34 above the diaphragm 26. The flow of fuel from the inlet to the upper side of the diaphragm equalizes the pressure on opposed sides of that member and because the effective area of the upper surface is greater than the effective area of the lower surface thereof, the diaphragm is maintained in a closed position.

Now let it be assumed that the space in which the thermostat 92 is located cools sufficiently to cause the movable blade of that member to move to the right into the effective range of the magnet. The contact 93 on the movable arm of the thermostat is then snapped into engagement with the stationary contact 94 and the thermostat-relay circuit is closed. The establishment of this circuit energizes relay 150 which operates to simultaneously close switches 151 and 152. The closing of switch 151 by relay 150 energizes relay 66 through a circuit previously described. The energization of relay 66 results in the prompt opening of pilot valve 57 to permit a flow of fuel from the inlet 12 through passage 101, valve 57, passage 102, adjustable restriction 103, passage 104, to pilot burner 61. A flow of fuel is now established between the inlet and the pilot burner 61. As previously noted, switch 152 closes concurrently with switch 151. The closing of switch 152 establishes a line voltage circuit previously traced and accordingly, there is created an ignition spark in the gap between the spaced electrodes 162 for igniting the fuel promptly upon its arrival at the outlet of the pilot burner 61. In the event the pilot burner is not ignited by such action, further operation of the device, as for instance the opening of the main valve, is prevented by the open switch 165.

Upon the establishment of a flame at the pilot burner 61, the switch 165 is caused to close, as previously described, and relay 64 is energized. The energization of relay 64 causes operating arm 67 to rotate in a counterclockwise direction which results in the opening of switch 157 in the ignition circuit and the movement of pilot valve 58 to open position wherein valve 59 is open and valve 60 is closed. The opening of valve 59 and closing of valve 60, which is in unison, functions to seal off passage 107 and prevent the delivery of pressure therethrough to the pressure chamber 34. This concurrent action of valves 59 and 60, when valve 70 of the pressure actuated pilot valve 53 is in open position, also establishes an outlet for the pressure chamber 34 through passage 111, valve 70 of pressure actuated pilot valve 53, passage 112, valve 59, passage 113, restriction 110, extension 114, to a point adjacent the burner 91. The opening of this outlet results in the bleeding of pressure from the chamber 34 and pressure on the opposite side of the diaphragm 26 then forces that member upwardly to open the main valve and permit a flow of fuel from the inlet 12 to the outlet 13. It is to be noted that while movement of valves 59 and 70 may establish or terminate flow from the chamber 34, they do not normally function to modulate this flow. As long as the valves 59 and 70 are in open position, the bleed from chamber 34 is constant and its rate is determined by the restrictor 110 in passage 113.

As the fuel flows through the outlet 13 a portion of it is diverted through passageway 116 to the portion of the recess 40 beneath the diaphragm 42. It is to be noted that recess 40 beneath the diaphragm 42 is not provided with an outlet. Consequently, the fuel diverted to operate diaphragm 42 may flow both to and from the recess 40 through passage 116. Additionally, this passage between the outlet 13 and the recess 40 is free of obstruction so that the pressure within the outlet 13 is promptly registered upon the diaphragm 42. Pressure built up within chamber 40 causes movement of the diaphragm 42 which movement in turn is transmitted to valves 69 and 70, on the regulator side of the pressure actuated pilot valve 53. The operation of valves 69 and 70 functions to control pressure in the chamber 34 and consequently the positioning of the diaphragm 26.

The rate of bleed from chamber 34 through passage 113 and restrictor 110 is relatively slow as compared to the rate of flow through an unrestricted passage, as for instance passage 121. Accordingly, normal control movement of valve 70 does not affect the rate of bleed from chamber 34. Only if an abnormal increase in the downstream pressure occurs, will valve 70 act to reduce the rate of bleed. However, movement of valve 69 toward open position increases flow through passage 121 and into chamber 34. The increased flow of pressure into chamber 34 forces diaphragm 26 downwardly, and as a result of this positioning of diaphragm 26 reduces the flow of fuel from inlet 12 into outlet 13. This reduction in the flow of fuel reduces the pressure in the outlet 13 and in chamber 40. Consequently, the diaphragm 42 now assumes a new position and in so doing causes valve 69 to be moved toward closed position, thus reducing the flow of actuating pressure into chamber 34. This action continues until pressure on opposed sides of the diaphragm 26 is substantially equal, and the flow of pressure through valve 69 into chamber 34 is also substantially equal to flow from chamber 34 through valve 70 and restrictor 110. The equalized pressure and equalized flow tend to maintain the diaphragm 26 in a substantially stable position. Slight fluctuations in supply pressure cause almost constant minute movement and readjustment of both diaphragm and pressure flow; however, these movements are normally so small that the diaphragm has the appearance of being stationary. As previously stated, the changes of pressure within the outlet are promptly registered upon the diaphragm 42. Therefore, outlet pressure as reflected on and actuating the diaphragm 42 controls the positioning of the main valve diaphragm 26 and likewise the pressure of fuel in the downstream side of the device. The pressure required to operate diaphragm 42 and its associated linkage may be selectively varied by setting the adjustment nut 84 to increase or decrease the tension of spring 83 as desired.

Additional fuel is diverted from the outlet in the downstream side of the device into passageway 117 through adjustable restriction 115 into the recess 38, beneath diaphragm 41, and then through passage 118 and temperature control valve 119 and passage 120 to a point closely adjacent the burner 91 where it is consumed. It is to be noted that so long as the temperature control valve 119 permits a greater volume of flow from the recess 38 than needle valve 115 permits to flow into the recess, outlet pressure is not registered on diaphragm 41; however, if during the operation of the device, the temperature of the bulb 124 reaches a predetermined high limit it functions to move valve 119 toward closed position. The closing movement of valve 119 curtails flow through passage 120 and causes a pressure to be built up in the recess 38. The pressure thus created operates to force the diaphragm 41 upwardly and opens valve 65 in passage 122 to admit pressure into chamber 34. This pressure functions to force the main valve toward closed position and as a result decreases the flow of fuel and reduces pressure in the outlet 13. The lowered pressure in outlet 13 is reflected in a change in the position of diaphragm 42 which causes valve 70 to move toward open position and valve 69 to move toward closed position. However, as previously stated, the restrictor 110 and not valve 70 normally controls flow from chamber 34; consequently, if the flow into the chamber 34, through either valve 65 or 69, is equal to or greater than flow from the chamber the main valve will not move toward open position. Under these conditions, the pressure regulator portion of the device is unable to maintain the pressure for which it is set since the limit control valve 119 dominates and is demanding less pressure than that for which the pressure regulator is set. If the temperature of the bulb 124 continues to increase after the flow of fuel to the main burner has been reduced by the above action, the valve 119 continues its closing movement to further reduce the flow of fuel to the main burner. At a predetermined high temperature, the switch 109 is opened whereupon the magnets 64 and 66 become deenergized and both pilot valves 57 and 58 are moved to closed positions by their biasing springs 68. As a result of the closing of pilot valve 57, the flame of pilot burner 61 is extinguished and as a result of the closing of pilot valve 58, the bleed passage 113 is completely closed by valve 59 and pressure from inlet 12 is directed through passages 121 and 111 to chamber 34 and closes the main valve. As long as the switch 109 remains open, the device will not respond to a call for operation from the thermostat 92, but upon the switch 109 assuming its closed position, as a result of temperature drop in bulb 124, the device will again operate in response to thermostat requirements. It will therefore be apparent that the main valve may be modulated or moved from completely closed to full open position or to any point therebetween by the control operation of the pressure actuated pilot valve 53 during the time the relay actuated pilot valve 58 is in energized or open position.

If during the operation of the device the thermostat 92 becomes satisfied and moves the contact 93 thereon from engagement with contact 94, the relays 64 and 66 are promptly deenergized. This deenergization permits the spring 68 to move the pilot valves 57 and 58 to closed position, as shown in Figure 7, wherein the valve 59 is seated, the valve 60 is unseated, and pilot valve 57 is closed. As a result of the closing of pilot valve 57, the flame of pilot burner 61 is extinguished and as a result of the closing of valve 59 and opening valve 60 pressure from the inlet 12 of the device is directed through passages 107, valve 60, passage 112, valve 70, passage 111, to pressure chamber 34. This pressure in chamber 34 moves the diaphragm 26 to closed position and the flow of fuel to the burner 91 is stopped. It is to be noted that flow of pressure from the chamber 34 is through pilot valves arranged in series and that flow of pressure to the chamber 34 may be through the series arranged pilot valves or may be controlled by pilot valves arranged in parallel.

*Modification*

In the modified form of the invention as shown in Figures 8, 9, and 10, some of the elements and the operation of the device are substantially the same as in the preferred embodiment, although a number of structural features are different. Accordingly, similar reference numerals are herein applied to elements substantially the same as those previously described. In the modification four sections, indicated by the references A, B, C, and D, are assembled to produce an entire unit. Section A which is provided with an inlet 210 and an outlet 211 having an apertured wall 212 therebetween is apertured on its inlet side as indicated by the reference numeral 213 to receive a pilot supply line. The edges of the aperture in wall 212 are turned upwardly, as is best shown in Figure 8, to provide a seat for a diaphragm 214. The diaphragm and seat cooperate to provide a main valve, as in the preferred embodiment. Section B is positioned on section A in precisely the same manner as section 30 is positioned on section 11 in the preferred embodiment. Portions of the diaphragm 214 closely adjacent its peripheral edge are interposed between opposing faces of the associated sections to provide a gasket and form a fluid-tight joint therebetween. The lower portion of section B is recessed, as is best shown in Figure 8, and when associated with section A forms a pressure chamber 215 above the diaphragm 214. The upper portion of section B is recessed, as is best shown in Figure 8, to provide a pressure chamber 216 with a diaphragm 217 as a movable wall thereof. The peripheral portion of the diaphragm 217 is secured over the chamber 216 by a securing ring 208. The pressure chamber 216 is connected to the outlet 211 of section A by means of a passage 218. Positioned within section B and operably associated with the diaphragm 217 by means of an operating arm assembly 221 is a pilot valve 222. The pilot valve 222 is similar to the pressure regulator side of the pilot valve 53 of the preferred construction and includes valves similar to valves 69 and 70 of pilot valve 53 which operate to control flow of operating pressure both to and from the pressure chamber 215 in the manner previously described. The operating arm assembly 221 includes a substantially T-shaped member hingedly secured at its transverse portion to the securing ring 208. The free end of the T-shaped member overlies the diaphragm 217 and is spaced therefrom by a stud and plate assembly 209, as is clearly shown in the drawing. Projecting at right angles to the free end of the longitudinal portion of the T-shaped member is an extension 223 best shown in dotted lines in Figure 9. The extension 223, free end of the T-shaped arm, and the diaphragm 217 are biased downwardly by spring 224 mounted on an adjustment screw (see Fig. 10). Threadedly secured on the adjustment screw 225 and slidably engaging the upper end of spring 224 is an adjustment gear 226. Rotation of the gear moves it longitudinally of the screw 225 and increases or decreases the tension of the spring 224 against the extension 223. Rotatably positioned in section B, as best shown in Figures 9 and 10, is a shaft 227 upon one end of which is formed a worm 228 which operably engages the adjustment gear 226. The opposite end of the shaft 227 is preferably slotted to receive an operating tool whereby the shaft may be rotated. Accordingly, it will be apparent that the shaft 227 may be rotated to adjust gear 226 and thereby alter the tension of spring 224 to vary the pressure required to move diaphragm 217 and operating arm 221. A cap 229 covers the outwardly projecting end of shaft 227 to protect it from accidental movement.

Section C is mounted on section B in precisely the same manner in which section B is mounted on section A. Section C is constructed along lines similar to section B and has an indented lower portion adapted to provide head room for the working parts positioned on section B. The upper portion of section C is recessed as at 231 to provide a pressure chamber for which the diaphragm 232 provides a movable wall. This section is also provided with a pressure actuated pilot valve 233 and an operating arm assembly 221 which connects the pilot valve with the diaphragm 232 for operation thereby. The operating arm assembly 221 here employed is not provided with a biasing spring and adjustment therefor as previously described. However, the T-shaped members of both sections B and C are provided with downwardly turned portions 219 to which counterweight 220 may be attached as is best shown in Figure 8. The pilot valve 233 is similar to the modulating or temperature control side of pilot 53 of the preferred embodiment and functions in the same manner to control the flow of operating pressure, to, but not from, the pressure chamber 215. The pressure chamber formed by the recess 231 is connected to the outlet portion 211 of section A by an inlet passage 235 and is also provided with an outlet passage 236, as is best shown in Figures 8 and 9. The inlet passage 235 is provided with a needle valve adjustment 230, shown in dotted lines in Figure 9, similar to a like member 115 shown in Figure 1. Secured in the outlet 236 and being adapted to be extended to a temperature responsive valve, as for instance valve 119, is an outlet passage 118a.

From the foregoing it will be apparent that pressure will not build up in the pressure chamber formed by recess 231 so long as outlet 236 remains open. Consequently, this chamber is effective to operate the pilot valve 233 only when the outlet 236 is obstructed or closed. On the other hand, pressure entering the chamber formed by recess 216 in section B is effective at all times during the operation of the device to exert an effective pressure on the diaphragm 217 to operate pilot valve 222. Thus, a complete operating unit for controlling the positioning of the main valve is positioned in each of sections B and C. The operating unit in section B functions as a regulator control, and the unit positioned in section C functions as a modulator or limit control.

Extending from the pressure chamber 215 above diaphragm 214 through sections B and C and being connected to pilot valve 222 and pilot valve 233 is a passageway 238. The passageway 238 shown in Figure 8 is similar to its counterpart indicated by the reference numerals 121 and 122 in Figure 7 and functions in precisely the same manner and for the same purpose. In the construction of various passages, as for instance 238, it has been found expedient to drill portions thereof from the peripheral surfaces of the sections and then to seal off the resulting outlets with friction or threaded plugs 234 as is best shown in Figure 8.

Section D is positioned on and secured to section C in the same manner that section C is associated with section B. The lower portion of section D is indented, as is best shown in Figure 8, to provide working space for the operating mechanism positioned on the upper portion of section C. The side wall of this section is provided with an aperture to receive an adjustment shaft 227, worm 228 and cap 229 similar to that shown associated with section C in Figure 10. When this section forms a part of the four section unit a closure as for instance cap 229 alone is positioned in the aperture. When the section is used in a three section assembly, the adjustment shaft 227 is also positioned in the aperture as hereinafter more fully explained. Positioned on the upper surface of section D is a relay actuated pilot valve assembly similar to the structure shown associated with the preferred embodiment. Accordingly the same reference numerals are here applied to indicate the relay 64, operating arm 67, and pilot valve 58. The pilot valve 58 is connected to the inlet side of section A by passage 241 shown in dotted lines in Figure 8. Where it is found to be advisable or expedient, pilot valve 57 may be omitted from the modification shown in Figures 8, 9, and 10 and the pilot light may be supplied from the aperture 213 in the inlet portion of section A.

Figure 11 shows diagrammatically the arrangement of the gas circuits employed in the modified construction. Although the circuits are similar to those shown in Figure 7 and the results obtained are precisely the same they are here described to more clearly explain the operation of the modified embodiment.

As previously explained, pilot valve 58 is a three-way valve which functions to control the flow of operating fluid to open and close the main valve. The pilot valve 58 is connected to the inlet 210 by passage 241 which extends through the several joined sections of the structure. Passage 241 may be provided with a branch 242 which extends into pressure operated pilot valve 233 and branch 242 is also provided with a branch 243 which extends into pilot valve 222. Operating pressure is thus directed to all three pilot valves. These passages 241, 242, and 243 are the counterparts of passages 107, 121, and 122 of the preferred embodiment shown in Figure 7. Passage 244 connects pilot valve 58 with pilot valve 222 and passage 238 connects pressure chamber 215 with pilot valve 222 and pilot valve 233. Pilot valve 58 is provided with a bleed passage 246 in which is located a spud or restrictor 248. Pilot valve 58 is provided with valves 59 and 60, and pilot valves 222 and 233 are provided with valves similar to those indicated by the reference numerals 70, 69, and 65, respectively, in Fig. 7. As previously explained, valves 59, 60, and 70 function to control flow to open and close the main valve and valves 65 and 69 function to control flow of operating pressure to modulate the main valve. As previously indicated, the sections of the improved control of this invention may be assembled to meet specific requirements without any change in the manufacture or construction of the sections or control parts. For instance an on and off valve may be produced by positioning the upper section 55 on lower section 11. An on and off valve having pressure control is obtained by omitting section C from the assembly shown in Figure 8. In the first structure the plug 49 is removed to provide a passage from the chamber 34 to pilot valve 58. In the second structure a cap similar to cap 229 is removed from section D to receive an adjustment operator similar to the shaft 227 and worm 228 shown in Figure 10. When the adjustment mechanism is positioned in section D and that section is assembled with section B, the adjustment worm 228 meshes with adjustment gear 226 precisely as in the four section assembly previously described. These changes may be made during installation or after the improved control device has been in operation. Likewise, if the device has been installed as an on and off valve or a pressure regulator, additional control sections may be added in the field without special tools or equipment. Accordingly, it is to be noted that the standard parts of the improved control device of this invention may be assembled at the factory or in the field to produce an "on" and "off" valve, an on and off valve having pressure regulating control, or an on and off valve having pressure regulating and flow modulating control. Additionally, because each of the above mentioned sections provides a complete control unit, the changes in assembly may be made without removing the device from a supply line in which it has been installed.

Operation

By reference to the schematic arrangement shown in Fig. 11, the operation of the system, in which the modified embodiment of the above described control apparatus is incorporated, may be more easily followed. As shown in Fig. 11, the control is shut down. The magnet 64 is deenergized and pilot valve 58 directs pressure from the inlet 210 and passage 241 through passage 244, pilot valves 222 and 233, passage 238, to the chamber 215 above diaphragm 214. As a result of this pressure, the main valve is maintained closed. Now assume that the pilot burner is functioning and in response to a demand for heat, as by a thermostat 92 shown in Fig. 7, the magnet is energized. As a result of the energization of magnet 64 operating arm 67 is rotated counterclockwise which causes pilot valve 58 to close a valve 60 cutting off pressure through passage 241 and opens another valve 59 permitting a return flow through passage 238, pilot valves 222 and 233, passage 244, pilot valve 58 and then through passage 246, restrictor 248 to a point closely adjacent burner 91. It is to be noted that valve 70 in pilot valve 222 is normally open. This valve functions to regulate bleed from the chamber 215 only when such bleed is below the capacity of the restrictor 248 as for instance on complete shutdown. Throughout the normal operation of the improved control apparatus bleed from the chamber 215 is constant. As the pressure in chamber 215 decreases as the result of the bleeding just described, pressure on the lower side of diaphragm 214 forces that member to open the main valve and permit the flow of fuel from the inlet 210 to the outlet 211. A portion of the fuel passing through outlet 211 is diverted through passage 218 into control chamber 216. The pressure so diverted creates a pressure in the chamber 216 and against diaphragm 217 and thereby moves operating arm 221 which in turn operates valves 70 and 69 in pilot 222. This manipulation of valves 70 and 69 controls the flow of pressure into but not from chamber 215. The pressure in chamber 216 controls and regulates the pressure in the outlet portion of the device in accordance with the setting of the adjustment mechanism shown in Figures 9 and 10.

Additional fuel is diverted from the outlet 211 through passage 235 into control chamber 231. The flow of fuel through passage 235 is controlled by adjustment of needle valve 230. A discharge passage 118a is provided for control chamber 231. This passage extends from chamber 231 to a control member, as for instance temperature responsive valve 119 and thence to a point closely adjacent burner 91. Valve 119 is normally in open position; accordingly, flow from chamber 231 may be at a much greater rate than the rate of flow into the chamber as controlled by needle valve 230. Therefore, pressure is built up within chamber 231 only when valve 119 is in closed or partly closed position.

Assume now that the system has been in operation for a period of time and that the pressure regulating portion thereof, control chamber 216 and pilot valve 222, is functioning properly and also that the thermostat is in unsatisfied position. Further assume that with these conditions existing the temperature responsive portion of valve 119 calls for a reduced fire. Valve 119 accordingly is moved toward closed position obstructing passage 118a and thus permitting a build up of pressure in chamber 231. The increased pressure in chamber 231 functions to open valve 65 in pilot valve 233 to admit pressure from passage 234 into chamber 215. The additional flow of pressure into chamber 215 being greater than the permitted flow through the restriction 248 results in the pressure being built up above diaphragm 214 which pressure forces the diaphragm toward closed position. As long as valve 119 restricts the flow of pressure from chamber 231 to a volume less than that permitted by needle valve 230, the main valve will remain in reduced flow position. This is true even though the pressure in chamber 216 is reduced below the setting of the pressure regulator adjustment and valve 70 is in wide open position and valve 69 is in closed position. Because as previously stated, restriction 248 and not valve 70 controls flow from chamber 215.

If during operation of the device under reduced flow conditions as above described the thermostat becomes satisfied, the magnet 64 is deenergized and pilot valve 58 closes the bleed outlet 246 which action results in a building up of pressure in the chamber 215 and the prompt closing of the main valve. If, however, the thermostat remains unsatisfied, and valve 119 reopens by reason of cooling of the heat responsive portion thereof, control of the device is again taken over by the pressure regulator pilot valve 222. It is to be noted that the positioning of the main valve is governed by the flow of operating pressure into chamber 215 as controlled by valves 65 and 69. The control of these valves over the positioning of the main valve ranges from a position wherein the main valve is completely closed to a position in which it is wide open. The function of pilot valve 58 is confined to either opening or closing control of the main valve.

It will be apparent from the foregoing that herein is provided a compact and efficient unit which by its very compactness and the elimination of radially projecting attaching flanges is especially adaptable for locations where installation and operating space is limited. Moreover, the elimination of projecting flanges from the sectional control device of this invention greatly enhances its appearance and lends a balanced and symmetrical effect to the construction.

It will also be apparent to those skilled in the art to which the device of this invention appertains, that numerous details of construction and design may be altered or changed without departing from the spirit or scope of this invention. Accordingly, the patent granted hereon is not to be limited to the precise embodiments here shown or in any other way except as may be necessitated by the terminology of the appended claims when given the range of equivalents to which they may be entitled.

I claim as my invention:

1. In a control valve comprising a plurality of casing members removably secured to each other in fluid tight association, a first one of said casing members having a passage extending therethrough and terminating in inlet and outlet portions, a valve seat intermediate said inlet and said outlet portions, a diaphragm cooperable with said valve seat to control fluid flow through said passage, a second one of said casing members being recessed and when operably attached to said first casing member providing a pressure chamber for said diaphragm, a first pilot valve means positioned on said second casing member for controlling fluid flow to and from said chamber, a passage extending from the inlet portion of said first casing member through said second casing member to said pilot valve means, a second pilot valve means positioned within said second casing, passage means connecting said first pilot means and said second pilot means, passage means extending from said second pilot means to said pressure chamber, said first and said second pilot means having separate condition responsive means for actuating them to start and stop flow through said connecting passage means when the other of said pilot means is in its flow permitting position.

2. In a fluid flow control device having inlet and outlet portions, a pressure actuated diaphragm valve positioned intermediate said portions, means for conveying fluid under pressure from said inlet portion to said pressure actuated diaphragm valve, a first means operable to vary the valve actuating pressure of said fluid to position said valve in response to fluid pressure in said outlet portion, said first means comprising a three way pilot valve operable to control flow of actuating fluid to and from said pressure actuated diaphragm valve, a second means operable to vary the valve actuating pressure to position said valve responsive to temperature requirements, said second means comprising a pilot valve operable to control flow of fluid under pressure toward said pressure actuated diaphragm valve only, and pilot valve means for initially opening said diaphragm valve by relieving the actuating pressure on said diaphragm.

3. In a control apparatus for a fluid fuel burner, a casing having an inlet and an outlet, valve means positioned intermediate said inlet and said outlet and operable to control the pressure and the flow of fuel therethrough, pressure actuated motor means for positioning said valve means, a three way pilot valve for selectively supplying fuel to or bleeding fuel from said motor means, a first means responsive to pressure in the outlet portion of said casing operable to increase fluid flow to said motor means as said outlet pressure increases and to shut off fluid flow from said motor means when a predetermined pressure is reached and thereby control positioning of said valve means, a second thermostatic means responsive to temperature conditions affected by operation of said burner to control positioning of said valve means by varying the flow of fuel to said motor means.

4. In a control apparatus for a fluid fuel burner, a main valve having an inlet and an outlet and operable to control the flow of fuel to said burner, pressure operable motor means for positioning said main valve, a first three way pilot means operable to cause the opening and closing of said main valve, temperature responsive means controlling the operable movement of said first three way pilot means, a second pilot means operable to modulatingly position said main valve when said first pilot means is in main valve opening position, said second pilot means having a plurality of passages between said inlet and said motor means and temperature responsive means and fuel pressure responsive means for controlling the operable movement of said second pilot means and hence the modulation of said main valve by each variably controlling a separate one of said passages between said inlet and said motor means.

5. In a control device, a member having an inlet and an outlet, a valve seat formed intermediate said inlet and said outlet, a diaphragm positioned adjacent said valve seat and cooperable therewith to form a main valve, fluid pressure operable motor means operably associated with said main valve, a plurality of passages for diverting fluid under pressure from said inlet to said motor means, a first three way pilot valve means having an exhaust port for controlling one of said passages to cause opening and closing movement of said main valve, and selectively usable second pilot valve means operable to control diverted fluid in another of said passages to operate said motor for positioning said main valve in response to outlet pressure, pressure motor means for said second pilot valve in communication with said outlet, said second pilot valve means being detachably associated with said control device so as to enable said control device to operate under the control of the three way pilot valve only.

6. In a control device, a member having an inlet and an outlet, valve means intermediate said inlet and said outlet, motor means operably associated with said valve means, a plurality of passages for diverting fluid under pressure from said inlet to operate said motor means, three way pilot valve means having an exhaust port for controlling said diverted fluid in one of said passages to operate said motor means to open and close said valve means, and condition responsive means detachably associated with said member and selectively usable therewith for controlling said diverted fluid in another of said passages to cause said motor means to position said valve means in response to said condition.

7. In a fluid flow control device having inlet and outlet portions, a pressure actuated diaphragm valve positioned intermediate said portions, means for conveying operating fluid under pressure from said inlet portion to said pressure actuated diaphragm valve, a first means operable to vary the flow of operating fluid to and from said valve in response to pressure in the outlet portion of said device, a second thermostatic means operable to vary the valve actuating pressure to position said valve in response to temperature changes, said second means comprising a pilot valve operable to control flow of fluid from said inlet to said pressure actuated diaphragm valve only, and three way pilot valve means having a bleed valve controlling fluid flow from said diaphragm valve and an inlet valve controlling the flow of fluid from said inlet to said diaphragm valve for initially opening said diaphragm valve by relieving operating pressure on said diaphragm, said pilot valve having a chamber between said bleed and inlet valves which is connected to the outlet side of said first valve.

8. A control device comprising a valve body having an inlet and an outlet and a main valve seat therebetween, a main valve cooperable with said main valve seat to regulate fluid flow through said body, a pressure motor engaging said main valve, a three way pilot valve mounted on said body, a first passage extending from said inlet to said pilot valve, a second passage extending in two portions from said pilot valve to said pressure motor, a third passage extending from said pilot valve to atmosphere, a fluid flow restrictor in said third passage, a control valve in said second passage having a chamber therein in constant open communication with the pressure motor through one portion of said second passage, said chamber having three valve seats formed therein, the first of said seats being directly connected to the other portion of said second passage, a fourth passage between the second of said seats and said inlet, a fifth passage between the third of said seats and said fourth passage, a two way valve cooperable with said first and second valve seats and normally engaging said second valve seat, means responsive to outlet pressure and operably engaging said two way valve, a single normally closed control valve cooperable with said third valve seat, and means responsive to a condition affected by fluid flow through said valve body for actuating said third valve.

9. A control device comprising a valve body having an inlet and an outlet and a main valve seat therebetween, a main valve cooperable with said main valve seat to regulate fluid flow through said body, a pressure motor engaging said main valve, a three way pilot valve mounted on said body, a first passage extending from said inlet to said pilot valve, a second passage extending in two portions from said pilot valve to said pressure motor, a third passage extending from said pilot valve to atmosphere, a control valve in said second passage having a chamber therein in constant open communication with the pressure motor through one portion of said second passage, said chamber having at least two valve seats formed therein, the first of said seats being directly connected to the other portion of said second passage, a fourth passage between the second of said seats and said inlet, a two way valve cooperable with said first and second valve seats and normally engaging said second valve seat, and means responsive to outlet pressure and operably engaging said two way valve.

10. In a control apparatus for a fluid fuel burner, a valve positioned in a fuel supply line having an inlet and an outlet and a main valve therebetween, motor means including a pressure chamber for positioning said main valve, a plurality of passages between said inlet and said motor means, pilot means for controlling the flow of fuel at operating pressure to and from said pressure chamber, said pilot means comprising an electromagnetic operated means operable to start and stop flow of fuel to and from said pressure chamber through one of said passages, a normally closed switch connected to said electromagnetic operated means, pressure actuated means connected to said outlet for controlling the flow of fuel into said pressure chamber through another passage, temperature responsive pilot valve means for controlling operation of said pressure actuated means, said temperature responsive pilot valve means being disposed to first cause operation of said pressure actuated means to cause movement of said main valve to a flow restricting position and then to open said switch and cause operation of said electromagnetic operated means to cause movement of said main valve to closed position.

11. A control device comprising an open top valve body having an inlet and an outlet with a valve seat therebetween, a diaphragm extending across said open top and cooperable with said seat to control fluid flow therethrough, a first passage extending from said inlet to the top of said body, a second passage extending from said outlet to the top of said body, a third passage extending from said outlet to the top of said body, a first control housing having a recess forming a pressure chamber with said diaphragm, a fourth passage in said first housing communicating with said first passage and extending to the top of said first housing, pressure responsive control means in said first housing communicating with said second passage for controlling the flow of fluid from said first passage to said pressure chamber, a fifth passage in said first housing extending from said third passage to the top of said first housing, a selectively usable second control housing shaped to fit on said first control housing and having a pressure motor in communication, said fifth passage for controlling the flow of fluid to said pressure chamber from said inlet, a sixth passage extending from said fifth passage to the top of said second control housing, a third control housing having a three way pilot valve, a switch passage in said third control housing extending from said three way pilot valve to the bottom surface of said third control housing so as to align with said sixth and said fifth passages, an eighth restricted passage leading from said three way pilot valve to atmosphere, and a ninth passage establishing communication between said three way pilot valve and said pressure chamber.

12. In a fluid flow control device, a pressure actuated combination modulator and regulator valve, a pressure chamber operably associated with said combination valve, means for controlling pressure in said chamber to position said valve and thereby regulate fluid flow through said device, said means comprising a pilot valve having two passages disposed in parallel to direct the flow of fluid under pressure only to said chamber and another passage disposed to direct flow from said chamber, three control valves for said passages, and two condition responsive means responsive to different conditions and connected to said valves for controlling fluid flow through each of said passages, one of said condition responsive means being connected to the one of said control valves cooperating with the passage connected with said pressure chamber and the other of said condition responsive means being connected to the other two of said control valves for selectively operating one or the other of said control valves into seating relationship with respect to said other passages.

FRANK B. DEMPSEY.

REFERENCES CITED

The following references are of record in the file of this patent:

UNITED STATES PATENTS

| Number | Name | Date |
|---|---|---|
| 1,533,875 | McClery | Apr. 14, 1925 |
| 1,853,194 | Bogle | Apr. 12, 1932 |
| 1,935,329 | Needham | Nov. 14, 1933 |
| 1,987,032 | Spence | Jan. 8, 1935 |
| 2,098,709 | Murden | Nov. 9, 1937 |
| 2,244,555 | Harris | June 3, 1941 |
| 2,301,978 | Signalness | Nov. 17, 1942 |
| 2,314,266 | Beam | Mar. 16, 1943 |
| 2,317,640 | Ray | Apr. 27, 1943 |
| 2,328,279 | Jones | Aug. 31, 1943 |
| 2,349,209 | Taylor | May 16, 1944 |
| 2,363,943 | Carlson | Nov. 28, 1944 |